United States Patent [19]

Ueberschaer et al.

[11] 3,993,480

[45] Nov. 23, 1976

[54] LEAD-ANTIMONY ALLOY

[75] Inventors: Armin Ueberschaer, Frankfurt am Main; Ulrich Heubner, Bad Homburg; Max Reinert, Stolberg, all of Germany

[73] Assignee: Metallgesellschaft Aktiengesellschaft, Frankfurt am Main, Germany

[22] Filed: Jan. 28, 1975

[21] Appl. No.: 544,717

[30] Foreign Application Priority Data

Jan. 28, 1974 Germany............................ 2403849

[52] U.S. Cl. ............................... 75/166 C; 429/226
[51] Int. Cl.² ......................................... C22F 11/10
[58] Field of Search ..................... 75/166 C, 166 B; 136/65

[56] References Cited

UNITED STATES PATENTS

| | | | |
|---|---|---|---|
| 2,694,628 | 11/1954 | Carroll | 75/166 C |
| 3,801,310 | 4/1974 | Nijhawan | 75/166 C |
| 3,879,217 | 4/1975 | Peters | 136/26 |

*Primary Examiner*—L. Dewayne Rutledge
*Assistant Examiner*—E. L. Weise
*Attorney, Agent, or Firm*—Burgess, Dinklage & Sprung

[57] ABSTRACT

A lead-antimony alloy is disclosed containing 0.5–3.5% by weight antimony, 0.025–0.3% by weight arsenic, 0.005–0.1% by weight selenium, 0.002–0.05% by weight tin, 0.01–0.1% by weight copper, balance lead. The alloy also preferably contains from 0.025–0.1% by weight silver.

8 Claims, No Drawings

LEAD-ANTIMONY ALLOY

BACKGROUND

This invention relates to a lead-antimony alloy, particularly for the grids of the plates of lead-acid storage batteries, preferably of starter batteries for internal-combustion engines.

The grids of known lead-acid storage batteries generally made from a Pb-Sb alloy which contains 4–11% antimony. Antimony imparts the required strength and casting properties to the pure lead, which is inherently very soft and cannot be used to make storage battery grids. In these alloys, the high-cost antimony component appreciably adds to the costs of manufacturing the grids. Besides, the susceptibility of the storage battery to self-discharge increases with an increase of the antimony content. An increase of the antimony content also increases the evolution of gas, and the migration of antimony ions to the negative electrode of the storage battery results in a poisoning of this electrode in operation.

For these reasons it has been attempted to minimize the antimony content of the grids for lead-acid storage batteries.

Attempts to make lead-acid storage battery grids which contain only 1.0–3.5% antimony have failed because the resulting grids are brittle and exhibit a tendency to crack. These phenomena appear to be due to a solidification with formation of coarse dendrites with resulting defects in the casting, such as shrinkage voids, microporosity, etc.

U.S. Pat. No. 2,148,741 discloses a lead-antimony alloy which contains antimony, tin, and arsenic or copper or selenium. An alloy which contains, e-g-, only arsenic and copper has a considerable tendency to crack and embrittle. On the other hand, alloys which contain selenium have the required hardness only if they have an antimony content above 6 %.

According to British Pat. No. 622,512, positive grids for lead-acid storage batteries consist of an alloy of lead, 1–5% antimony, and 0.005–0.5% selenium. The selenium content reduces or eliminates the tendency of the grids to crack as they cool after the casting operation.

As has been described hereinbefore, a cracking of as-cast lead alloys having a low antimony content of 1–3.5% can be avoided but these grids are so soft that they cannot be processed to form finished plates of storage batteries.

British Pat. No. 1,105,548 describes antimony free alloys for grids of lead-acid storage batteries. These alloys consist of lead, tellurium, silver, and arsenic. These alloys are also too soft in general and for this reason have not been successful in storage battery technology.

U.S. Pat. No. 3,801,310 discloses a low-antimony lead alloy for grids of plates of lead-acid storage batteries, which alloy consists of 1.5–3.5% by weight antimony, 0.025–0.20% by weight arsenic, 0.005–0.1% by weight Selenium, and 0.01–0.05% by weight tin, balance lead. When this alloy is used for positive grids of plates of industrial storage batteries and thin positive grids for plates of starter batteries, it is desirable for the alloy to contain 0.025–0.1% by weight silver which is said to stabilize the structure, increase the toughness and improve the resistance to corrosion. According to this disclosure, the addition of tin improves the castability and the casting rate, the addition of selenium prevents cracking, and the addition of arsenic increases the hardness.

On the other hand, this low-antimony lead alloy has the disadvantage that it is contaminated by considerable amounts of dross when melted and cast at the conventional temperature, which are between about 450° C and 550° C. A high contamination by dross results in great difficulties and in losses of metal during the processing of such cast lead alloys.

This invention reduces the contamination by dross whereas the other advantageous properties of the alloy are not adversely affected.

SUMMARY

This is accomplished in that 0.01–0.1% by weight copper is added, in accordance with the invention, to a low-antimony/lead alloy which contains 0.5–3.5% by weight antimony, 0.025–0.3% by weight arsenic, 0.005–0.1% by weight selenium, 0.002–0.05% by weight tin, balance lead. It is surprisingly been found that such an addition of copper greatly reduces the contamination of such low-antimony lead alloys by dross.

It has been found that a desirably low-antimony/lead alloy contains 1–2% by weight antimony and 0.1–0.2% by weight arsenic.

DESCRIPTION

For high-duty grids, a low-antimony lead alloy composed of 2.2–2.8% by weight antimony, 0.2–0.3% by weight arsenic, 0.01–0.04% by weight selenium, 0.003–0.03% by weight tin, 0.015–0.06% by weight copper, balance lead, has proved particularly desirable.

It will also be desirable for the alloy according to the invention to contain also silver in an amount of 0.025–0.1% by weight, preferably 0.03–0.06% by weight.

According to a further feature of the invention, selenium is replaced entirely or in part by sulfur in an amount of 0.002–0.012% by weight, preferably 0.02–0.06% by weight. This is desirable not only because the cost is reduced but also because sulfur is less toxic than selenium as the maximum concentration of selenium at a working place is only one-tenth that of sulfur. Besides, the desired effect can be produced by sulfur in a smaller amount than by selenium. This fact is of great significance for the manufacture and processing of the material as well as for the reprocessing of the storage battery scrap. Sulfur has the same effect on the castability as selenium and can substitute selenium in this respect to full satisfaction. Another advantage of sulfur resides in that, contrary to a prejudice in the art, sulfur does not increase the contamination by dross and does not quickly burn out of the molten material when sulfur has been completely incorporated in the alloy.

The selenium content of the lead-antimony alloy may amount more than 0.005–0.1 % by weight, preferably 0.006–0.1 % by weight, particularly 0.04–0.1 % by weight.

The copper content of the lead-antimony alloy preferably may amount to 0.05–0.1 % by weight. More preferably more than 0.1–0.15 % by weight, especially 0.12 % by weight has good results with respect to the amount of dross.

The advantages afforded by the invention as regards the reducton of the contaminating dross will be explained hereinafter with reference to several examples.

In all experiments, 30 kilograms of molten material were held in an iron crucible 136 millimeters in diameter at a temperature of 500° C under still air and were agitated by means of a stirrer rotating at 170 r.p.m. After a treatment for 2 hours, the stirrer was removed, the dross was carefully removed from the molten material, and the weight of the dross was determined. The following results were obtained:

| Alloy | Initial Composition in % by Weight | | | | | | | Quantity of Dross in g |
|---|---|---|---|---|---|---|---|---|
| | Sb | As | Sn | Se | Cu | S | Pb | |
| I | 2.5 | 0.05 | 0.02 | 0.04 | — | — | balance | 221 |
| II | 2.5 | 0.05 | 0.02 | 0.04 | 0.05 | — | balance | 156 |
| III | 2.5 | 0.25 | 0.02 | 0.04 | 0.05 | — | balance | 133 |
| IV | 2.5 | 0.25 | 0.02 | — | 0.05 | 0.011 | balance | 124 |

As is apparent from the foregoing Table, the Amount of dross formed in the low-antimony lead alloy composed according to the invention (II) and containing 0.05% by weight copper was lower by almost one-third than the amount of dross formed in the copper-free low-antimony lead alloy (I) known in the art.

The amount of dross formed was reduced by about 40% when the arsenic content of the low-antimony lead alloy according to the invention was increased to 0.25% by Weight (III).

In a second test run 30 kilograms of molten material of an alloy consisting of 0.12% copper, 0.015% tin, 0.25% arsenic, balance lead were held in an iron crucible 136 millimeters in diameter at a temperature of 500° C under still air and were agitated by means of a stirrer rotating at 170 r.p.m. After a treatment for 2 hours the stirrer was removed and the dross was carefully removed. The amount of dross formed was reduced to even higher degree, by about 80%, if a higher copper content was added with the higher arsenic content and a lower tin content.

For the low-antimony lead alloy (IV), in which selenium is replaced by 0.011% by weight Sulfur, the weight of the dross was determined as well as the sulfur content. It was found that the analytically determined sulfur content amounted to about 0.011% by weight at the beginning of the experiment and after a testing time of 2, 4, and 8 hours, whereas it had been believed that the alloy which had a lower tin content of 0.02% would form dross in an amount larger than that which was found so that the sulfur content would be reduced.

For a comparison the same low-antimony lead alloy (IV) was subjected to the same experimental conditions without an addition of tin. In this case too, the sulfur content remained constant from the beginning of the experiment to its end when 90 grams of dross had been formed.

In the processing and use of the previously conventional lead antimony alloys for grids of plates of lead-acid storage batteries for many years it has been found that the advantages afforded by the addition of copper are not offset by disadvantages which are significant in practical use. The same remark is applicable to a higher arsenic content of, e.g., 0.25% by weight. Besides the replacement of all or part of the selenium by sulfur also involves no disadvantage.

What is claimed is:

1. Lead-antimony alloy consisting of
   0.5–3.5% by weight antimony,
   0.025–0.3% by weight arsenic,
   0.005–0.1% by weight selenium,
   0.002–0.05% by weight tin,
   0.01–0.1% by weight copper,
   balance lead.

2. Lead-antimony alloy of claim 1 wherein antimony is present in an amount of 1–2% by weight and arsenic is present in an amount of 0.1–0.2% by weight.

3. Lead-antimony alloy of claim 1 wherein antimony is present in an amount of 2.2–2.8% by weight, arsenic is present in an amount of 0.2–0.3% by weight, selenium is present in an amount of 0.01–0.04% by weight, tin is present in an amount of 0.003–0.03% by weight, and copper is present in an amount of 0.015–0.06% by weight.

4. Lead-antimony alloy consisting of
   0.5–3.5% by weight antimony,
   0.025–0.3% by weight arsenic,
   0.005–0.1% by weight selenium,
   0.002–0.05% by weight tin,
   0.01–0.1% by weight copper,
   0.025–0.1% by weight silver, preferably
   0.03–0.06% by weight silver,
   balance lead.

5. Lead-antimony alloy consisting of
   0.5–3.5% by weight antimony,
   0.025–0.3% by weight arsenic,
   0.005–0.1% by weight selenium,
   0.002–0.05% by weight tin,
   0.01–0.1% by weight copper,
   balance lead, said selenium being replaced in whole or in part by sulfur in an amount of 0.002–0.012% by weight, preferably 0.002–0.006% by weight.

6. Lead-antimony alloy of claim 1 wherein selenium is present in an amount of more than 0.005–0.1% by weight, preferably 0.006–0.1% by weight, particularly 0.04–0.1% by weight.

7. Lead-antimony alloy of claim 1 wherein copper is present in an amount of 0.05–0.1% by weight.

8. Lead-antimony alloy of claim 1 wherein copper is present in an amount of more than 0.1–0.15% by weight, preferably about 0.12% by weight.

* * * * *